United States Patent [19]

Thompson

[11] Patent Number: 5,493,386
[45] Date of Patent: Feb. 20, 1996

[54] MULTI-TONER IMAGE FORMING APPARATUS AND METHOD HAVING PATTERN RECOGNITION

[75] Inventor: John R. Thompson, Canandaigua, N.Y.

[73] Assignee: Eastman Kodak Company, Rochester, N.Y.

[21] Appl. No.: 332,184

[22] Filed: Jan. 3, 1995

[51] Int. Cl.⁶ .................................................. G03G 15/01
[52] U.S. Cl. ............................................. 355/328; 382/181
[58] Field of Search .............................. 355/328, 326 R, 355/201, 200, 210; 382/181, 165

[56] References Cited

U.S. PATENT DOCUMENTS

| | | | |
|---|---|---|---|
| 4,538,182 | 8/1985 | Saito et al. ............................... | 358/280 |
| 4,558,374 | 12/1985 | Kurata et al. .......................... | 358/287 |
| 4,711,553 | 12/1987 | Watanabe ..................................... | 355/4 |
| 4,716,456 | 12/1987 | Hosaka et al. ............................ | 358/75 |
| 4,777,510 | 10/1988 | Russel ........................................ | 355/7 |
| 4,857,955 | 8/1989 | Crandall ................................. | 355/328 |
| 4,862,217 | 8/1989 | Russel ..................................... | 355/218 |
| 4,870,268 | 9/1989 | Vincent et al. ......................... | 250/226 |
| 4,878,063 | 10/1989 | Katerberg ................................ | 346/1.1 |
| 4,882,620 | 11/1989 | Shimizu et al. .......................... | 358/75 |
| 4,994,907 | 2/1991 | Allen ........................................ | 358/41 |
| 5,027,195 | 6/1991 | Cooley et al. ............................ | 358/75 |
| 5,034,901 | 7/1991 | Kuwata ............................... | 382/181 X |
| 5,055,921 | 10/1991 | Usui ........................................ | 358/44 |
| 5,075,770 | 12/1991 | Smyth ...................................... | 358/80 |
| 5,105,266 | 4/1992 | Telle ....................................... | 358/80 |
| 5,138,465 | 8/1992 | Ng et al. ................................. | 358/153 |
| 5,187,521 | 2/1993 | Shimizu et al. ......................... | 355/202 |
| 5,206,687 | 4/1993 | Suzuki et al. ........................... | 355/214 |
| 5,430,525 | 7/1995 | Ohta et al. .......................... | 382/181 X |

*Primary Examiner*—R. L. Moses
*Attorney, Agent, or Firm*—Leonard W. Treash, Jr.

[57] ABSTRACT

Image forming method and apparatus is capable of making images in at least a two different colors or toners. An original is electronically scanned for recognizing a predetermined characteristic of a pattern on the original, such as its color, size and/or shape. The image forming apparatus then provides the recognized pattern in a chosen accent color or in a toner different from that used for the rest of the image.

20 Claims, 4 Drawing Sheets

MULTI-TONER IMAGE FORMING APPARATUS AND METHOD HAVING PATTERN RECOGNITION

This invention relates to image forming apparatus capable of producing images in at least two toners, for example, two colors, from electronically scanned originals. Although not limited thereto, it is particularly usable in image forming apparatus providing two color images in which one of the colors is black.

Copiers and printers, for example, certain electrophotographic image forming apparatus, now provide full color images in copying environments. In full color imaging, usually three images of combinable, relatively transparent toners such as cyan, magenta and yellow toners, are combined to form a duplication of an original. The original may be separately exposed through filters or scanned by a is three color CCD scanner, for example, a red, green and blue scanner to obtain the necessary image information for full color reproduction. This process is relatively slow and requires combinable toners and a high degree of image registration.

"Accent" or "highlight" color imaging, however, is adaptable to most office copiers and duplicators. For example, an image forming apparatus includes means for forming a black image, means for forming one or more color images and means for combining the images, either in the formation or after formation. (It is also known to use this process with two different toners of the same color, for example, magnetic and nonmagnetic black toners.) Good registration is desirable but not as critical as in full color imaging. Although two colors may be adjoining, they are usually not overlapped. Thus, the toners can be opaque. This image forming approach is particularly useful in producing black text and a letterhead or logo in a color different from the text. It may also be used with yellow or another light color for highlighting text (in which case the text often is overlapped onto the highlighting color). Accent color has been incorporated in high speed and high volume office copiers that are predominantly used for black text reproduction. Although accent color is most commonly used with a single color available in addition to black, copiers are presently on the market that are capable of producing three accent colors and black in a single operation.

In the usual copier with an accent or highlight color feature, it makes no difference what color the original is. The portion of the original to be reproduced in the accent color is input electronically by the operator, usually using a digitizing tablet, and the apparatus produces a color image of the image part of that portion and a black image of the image part of the rest of the document. The inconvenience associated with use of a digitizing tablet has greatly restricted accent color usage in apparatus having this feature. However, the increase in the number of computers with color displays and color printers has and will continue to increase the number of documents with accent color. In many cases, the particular color is used to convey information or is referenced in the text and is, thus, an important part of the document.

U.S. Pat. No. 4,777,510, granted to Russel Oct. 11, 1988, is one of a number of references suggesting circling or highlighting the portion of the original to be copied in accent color in an ink readable by the apparatus. The apparatus reads the designation and automatically separates the image into two colors. This is easier than using a digitizing tablet, but requires marking up the original or a copy of it as well as extensive color recognition apparatus.

U.S. Pat. No. 5,027,195, granted to Cooley et al Jun. 25, 1991, discusses color recognition schemes using a three color scanner to detect or recognize a color electronically in order to make accent color copies automatically.

U.S. Pat. No. 4,711,553, granted to Watanabe on Dec. 8, 1987, shows a two color electrophotographic image forming apparatus having two CCD line sensors for scanning an original to identify the colors of the original image for use in controlling an electrostatic image erase device in making two color images.

SUMMARY OF THE INVENTION

It is an object of the invention to provide an image forming apparatus for making an at least two toner image from an original, with improved automatization in use.

This and other objects are accomplished by an image forming apparatus having first means for forming a first image in a first toner, for example, a first color from electronic image information and second means for forming a second image from electronic image information in a second toner, for example, an accent color different from the first color. These two means can include some of the same components. Means for electronically analyzing a scanned original image recognizes a predetermined characteristic of a character, logo or other pattern, such as, its color, size and/or its shape. Means for controlling the second image forming means forms an image of the pattern recognized, in the second toner. Means for controlling the first image forming means forms an image in the first toner from at least a portion of the original image. The two images may be combined to form a two toner image, for example, a two color image.

According to a preferred embodiment, conventional pattern recognition principles are used in algorithms which recognize the shape of a pattern that is part of the original image to be reproduced, by comparing it to a predetermined pattern. The operator can then have that pattern, wherever it occurs, formed in a particular color in the final copy. For example, the shape of a company logo can be input into memory in the logic and control of the image forming apparatus. Using conventional pattern recognition techniques, that logo can be recognized wherever it occurs on an original, with or without an input restriction on size. The copy of the original can then be made with the logo in the desired company color and the rest of the document in black. This is effected by pressing a few buttons, or the like, on a control panel without using a digitizer and without the need of a color scanner.

According to a further preferred embodiment, a size range restriction on the pattern is input so that only patterns larger than, smaller than or equal to a particular size are treated with a different color in the final output.

According to another preferred embodiment, size alone is used as the characteristic. For some originals, it is desirable to recognize all patterns above a particular size and use a particular color for that pattern. In many instances, this would handle all logos (including variations) with somewhat more reliability than a system relying on shape. However, it would not work as well when the logo is not of a unique size in the original.

According to another embodiment, a word or name can be treated as a pattern. Therefore, the company's name or a trademark could automatically be converted to color any place it appears in the document.

According to a further preferred embodiment, a color scanner is used. Color information is available from the scanner and the electronics, using conventional color recognition approaches, recognizes colors with a predetermined degree of closeness to the color desired. Copies from originals with a pattern having the predetermined color can be made whatever desired color is available in the image forming apparatus. This would be particularly useful compared with the other embodiments when different shapes and sizes are used for perhaps more than one company logo in the original or the name of the company is also in the company color. It, of course, has the disadvantage of requiring some color information about the original on at least an area-by-area basis, if not pixel-by-pixel. It thus requires a color scanner, not required when recognizing size or shape.

According to another embodiment, the two toners can be of the same color but be otherwise different. For example, a black magnetic toner is used with an ordinary black non-magnetic toner. A standard font for Magnetic Ink Character Recognition (MICR) is recognizable in the originals and accurate copies made of original documents having a mixture of the two types of ink.

This invention is not necessarily usable for all documents. The digitizing tablet may still be necessary to gain the effects desired in some instances. However, when it is usable, it is far easier and quicker than utilizing the digitizing tablet. It is also possible to combine the digitizing tablet with features of the invention and just treat particular areas of the original (as determined by the digitizing tablet) with automatic recognition.

DETAILED DESCRIPTION OF THE INVENTION

DESCRIPTION OF THE PREFERRED EMBODIMENTS

Figure 1:
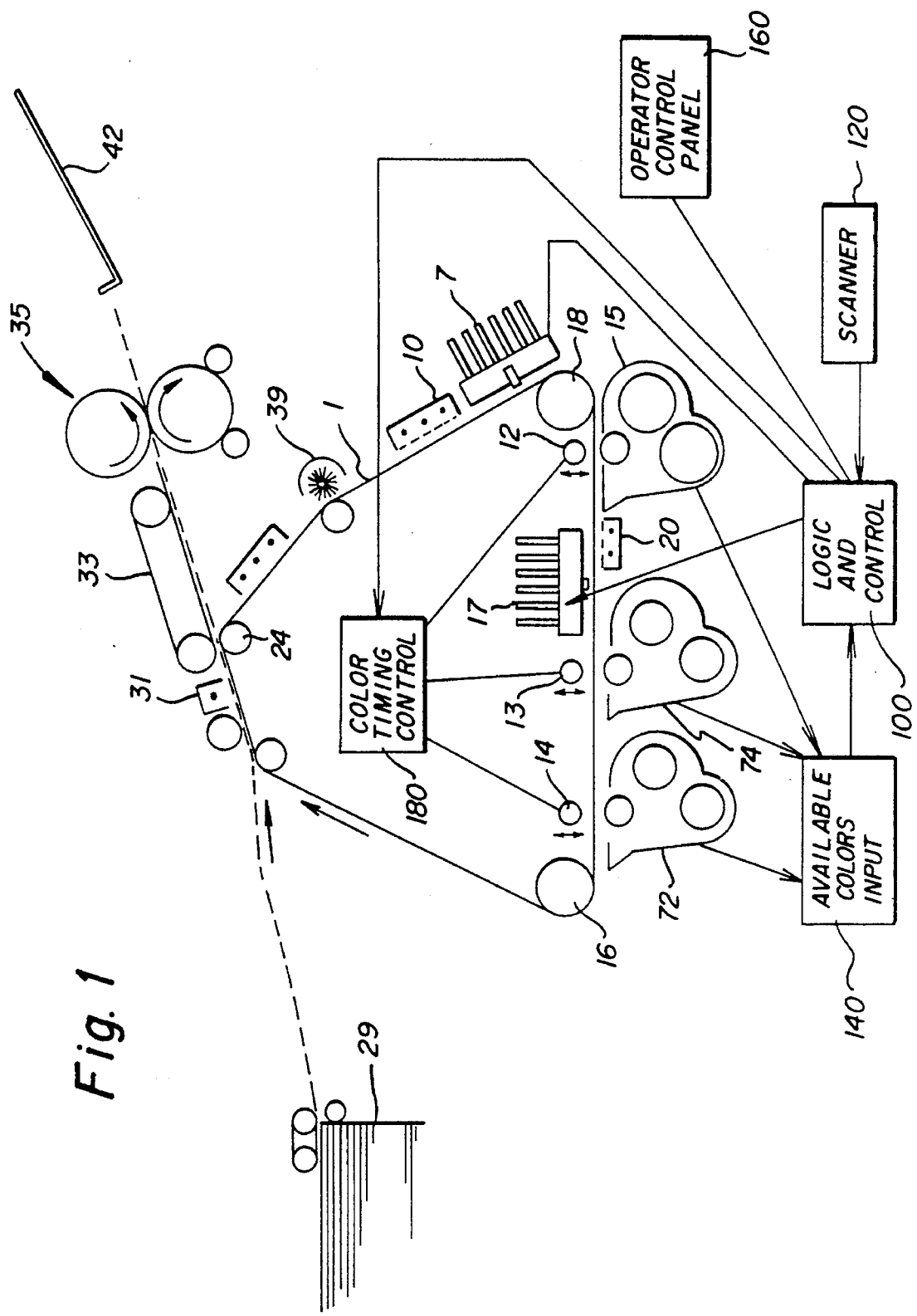
FIG. 1 is a side schematic of an image forming apparatus.

FIG. 1 shows an image forming apparatus capable of forming two color images electronically from input from an original scanner 120. A logic and control 100 controls the apparatus including image formation in response to inputs from an operator control panel 160. The scanner can be physically separate from the rest of the image forming apparatus. Preferably, however, it is in the same housing as the rest of the image forming apparatus, and the combination thereby functions as an electronic copier.

Wherever it is located, scanner 120, using conventional CCD technology, scans an original and converts it into an electronic signal, which is fed to the logic and control 100. The signal may be compressed, stored, enhanced and otherwise manipulated, but it is eventually used to form two toner images as controlled by logic and control 100. For convenience, the toner images will be described as different color toner images, but they can be of the same color but be otherwise different, for example, magnetic and nonmagnetic.

The image forming apparatus includes an image member, for example, a photoconductive belt 1 which is trained around a series of rollers, including rollers 16, 18 and 24 for movement continuously through an endless path. Image member 1 is first uniformly charged at a first charging station 10. It is imagewise exposed by a first electronic exposure device, for example, a first LED printhead 7 to form a first electrostatic image. The first electrostatic image is toned by the application of a first color toner from a first toning station 15 to form a first toner image. Usually this color is black, although other colors could be used.

Image member 1 is, again, uniformly charged by a second charging station 20 and imagewise exposed by a second electronic exposure device, for example, a second LED printhead 17 to create a second electrostatic image, generally in the same frame or area as the first toner image. The second electrostatic image is toned by application of toner from one of two toning stations 72 or 74 to create a second toner image having a color (or other difference) from the first toner image, thereby forming a two color toner image on image member 1. Toning stations 72 and 74 can contain accent color toners, for example, red and blue, thereby giving the operator a choice of providing accent color reproductions in black and either red or blue. Many other colors are available commercially for accent color image forming apparatus.

The two color image proceeds to a transfer station 31 where it is transferred to a receiving sheet fed out of a receiving sheet supply 29. The receiving sheet is transported by a transport device 33 to a fuser 35 where the image is fixed to the receiving sheet. It ultimately is deposited in an output tray 42. Image member 1 is cleaned by a cleaning device 39 so that it can be used continuously.

Determination of which toning station tones an electrostatic image is provided by backing rollers 12, 13 and 14 which are selectively movable toward their respective toning stations by a color toning control 180 controlled by logic and control 100, to position the image member 1 close enough to the toning station to tone the image passing. A bias associated with each toning station can also be adjusted between toning and non-toning conditions.

This invention is not limited to the approach to forming accented images that is disclosed in FIG. 1. For example, other electrophotographic methods of forming accent color images presently in commercial use as well as inkjet methods and other technologies could be used. For example, several commercial copiers presently on the market provide black and one or more accent color images on different frames of a photoconductor and then combine those images at a transfer station by recirculation or re-presentation of a receiving sheet. A process known as "tri-level xerography" is also presently used for the production of accent color images using a single electronic exposure.

In the known commercial devices, an operator using some sort of electronic input device must decide which portion of the scanned original is to be black and which portion of the original is to be in which of the available accent colors. In such machines scanner 120 is a simple black and white scanner which provides electronic input to logic and control 100 indicative of light and dark image information without respect to color. A digitizing tablet is used to input which areas are to be toned with black and which areas are to be color and, therefore, which areas from the original make up the first and second electrostatic images created by printheads 7 and 17, respectively.

According to the invention, the digitizing tablet can be eliminated for many applications. The scanned image itself is analyzed for image information that is usable to decide which portions to color and, in preferred embodiments, in what color.

According to one embodiment, scanner 120 is capable of some color recognition. At its most expensive, scanner 120 is a three color scanner which provides an output indicative of the reflective characteristics of each pixel for three different portions of the spectrum, for example, red, green and blue portions. Alteratively, the invention can be practiced using sensitivity to less than three portions of the spectrum, for example, just the red and blue portions. As another alterative, the color sensitive portions of the scanner are sensitive only to areas rather than to the color of each pixel making up the image. U.S. Pat. No. 5,027,195, referenced above, suggests color recognition using a color array of pixels having two rows, one alternating red with green and the other alternating blue with green. This patent is hereby incorporated by reference herein.

Logic and control 100 receives an input indicative of the colors available in stations 72 and 74 as an available colors input 140. The color in toning station 15 is also input to the logic and control 100 unless it is assumed that it is black. The identity of the colors, especially in stations 72 and 74, can be input by the operator or can be automatically input by a sensing mechanism associated with the stations or with received toner bottles. Such sensing mechanisms are generally known in the art.

Figure 2:
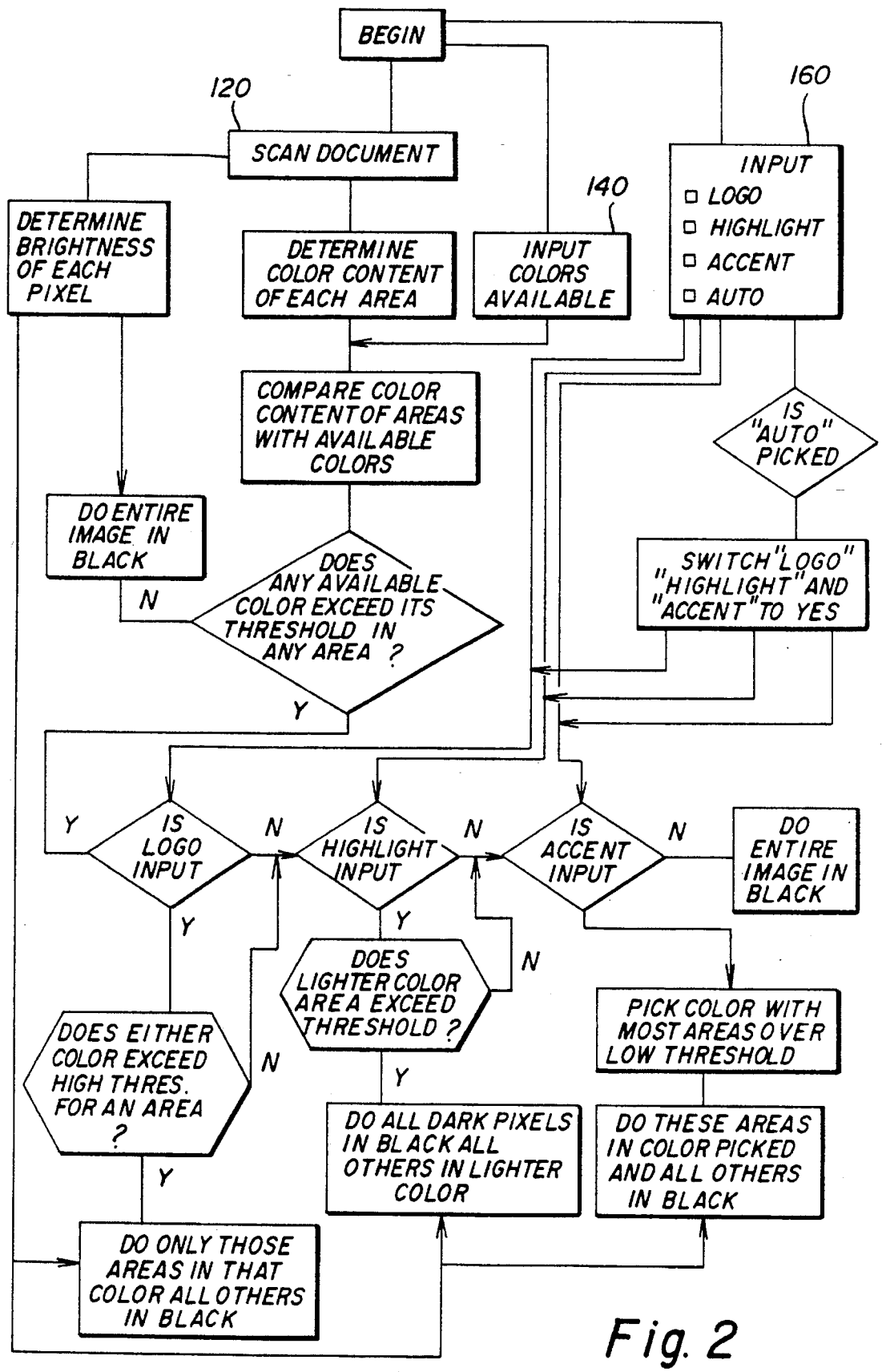
FIG. 2 is a flow chart describing a use of the apparatus shown in FIG. 1.

FIG. 2 is a flow chart illustrating a general approach used in forming a two color image from an original having some detectable non-neutral color and using the apparatus shown in FIG. 1. The original is scanned by scanner 120 which can be a scanner providing a pixel by pixel indication of color. That is, it can be a three color scanner providing red, green, blue and luminance or brightness outputs for each pixel. Alternatively, scanner 120 can provide a high resolution reading of image brightness or luminance and a much coarser reading of color. For example, brightness could be determined with a 12 pixel per millimeter scanner while color is determined with a 2 pixel per millimeter scanner. The term "area", thus, can refer to a pixel of the same fineness as those used in forming well formed or letter quality image text, or an area can be equal to a number of such image pixels.

Scanner 120 provides a separate indication of a color aspect of the image, area by area. For example, with a three color scanner, for each area scanned, the red, green and blue output is input into logic and control 100 and is compared. For a given area, a particular balance of readings indicates a neutral area. The colors available in stations 72 and 74 are also input into logic and control 100. Areas that are unbalanced with respect to neutral are compared with comparable color values for the colors available in stations 72 and 74.

Using appropriate thresholds, the entire document is analyzed with respect to whether it has a significant number of areas that are not neutral. If the answer to this question is "no ", then the entire document is printed with black station 15. If the answer is "yes", then a number of options can be available according to the programming of the apparatus.

As shown in FIG. 2, the operator control panel 160 can include operator actuatable buttons to indicate options such as "logo", "highlight" and "accent". An "auto" button is provided to actuate simultaneously the "logo", "highlight" and "accent" options with the logic and control 100 choosing between them according to the document.

Assuming that the "auto" button has been pushed as shown in FIG. 2, the first priority option is the "logo" option. In this option the area colors are compared with the available colors in stations 72 and 74 looking for very high correlations. If a predetermined minimum number of the areas has a very high correlation with one of the colors in stations 72 and 74, then those areas are reproduced in that color using the station of stations 72 and 74 containing that color. The other areas of the image are all reproduced in black. As in all options, the actual imaging is accomplished using the brightness or luminance signal for each pixel.

A slight variation in the "logo" option would be a "security" option (not shown in the drawings). In this option a particular color is used for security warnings, perhaps originating from a stamp. If that color is recognized, it can be given first priority and reproduced. A log of its copying can be made.

Furthermore, if the accent color is a very special custom accent color, for example, part of the corporation's trademark, the logic 100 can prevent the use of that color for patterns other than the logo.

The "logo" (or "security") option assumes that it would be desired only if the color in one of the stations very closely matches that of an original color. If an insufficient number of areas or total area exceed the relatively high threshold required for the "logo" option, the program goes on to the next priority option, the "highlight" option.

In the "highlight" option an inference that highlight is present can be taken from alternative information. For example, if areas have a slightly reduced blue signal that otherwise appears to be background, an inference is drawn that the area had been highlighted by a yellow marker. If more than a minimum number of areas contain this characteristic, then all such areas are overprinted in whatever highlight color is available, e.g., yellow, pink, orange, etc., while the rest of the image is done in black. Similar inferences can be drawn from a light orange, light pink or light green detection. Note this option does not necessarily match the color. It infers highlight in the original and then makes copies using the available highlight color.

If this "highlight" condition does not exist then the logic and control goes to its third option priority, the "accent" option, which merely picks the color from station 72 or 74 which comes closest to the most number of unbalanced areas. All such areas are then produced in that color and all the others are reproduced in black. This threshold would ordinarily be substantially lower than the threshold considered for the "logo" option.

The results obtainable with this approach are infinite. These results depend on the identity of the colors in stations 72 and 74, the colors of the original, and the thresholds used in logic and control 100. It is well within the skill of the art to adjust the thresholds in the logic and control with respect to any color included in stations 72 and 74.

Figure 3:
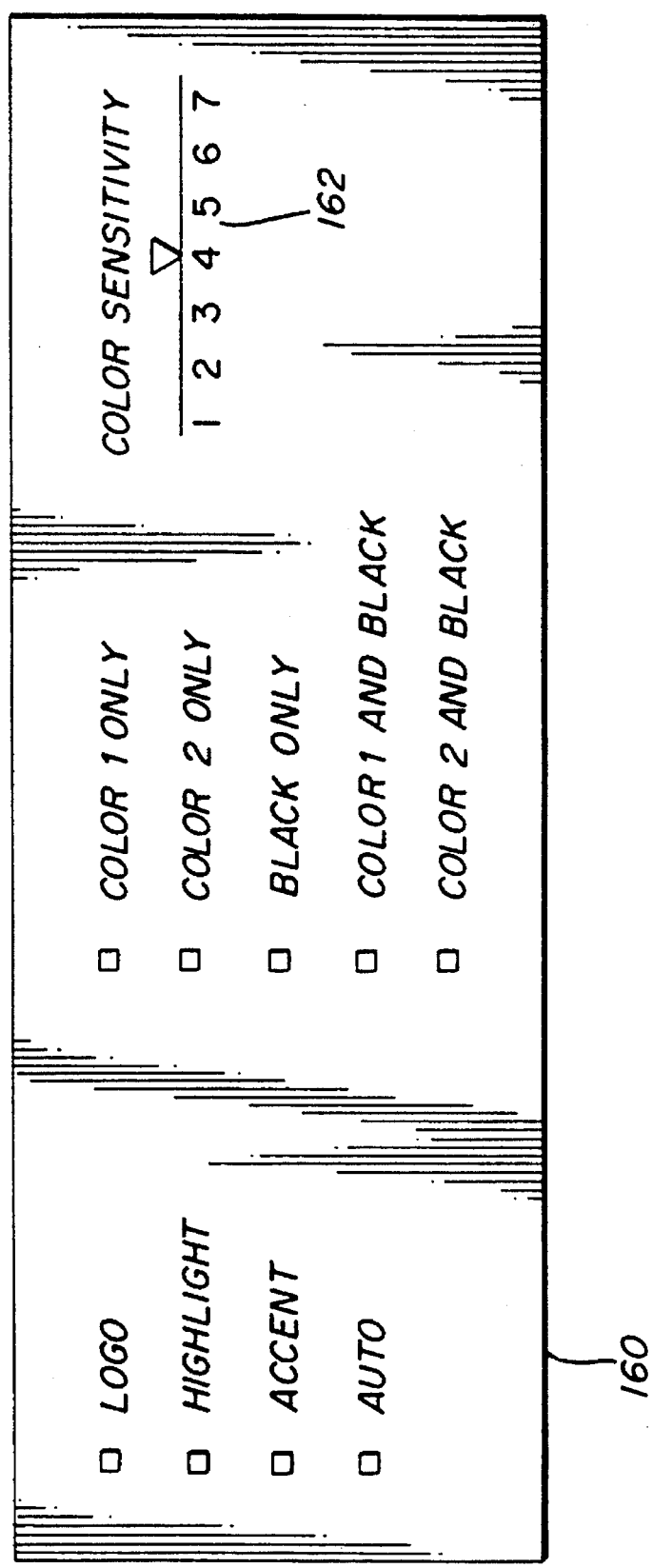
FIGS. 3 and 4 are front schematics of portions of alternative operator control panels.

Referring to FIG. 3, an expanded version of operator control panel 160 is shown with the buttons shown in FIG. 2 as well as buttons in which the operator can override the automatic aspects of the system and determine exactly which colors are going to be used. There is also a color sensitivity adjustment mechanism 162 which allows the operator to determine how sensitive reproduction is going to be to variations from the actual color. Basically, the color sensitivity adjustment mechanism 162 varies the thresholds at which a pixel in an unbalanced area is printed in color or is printed in black. For example, a lower sensitivity might produce a pixel in a chartreuse area as red, while a higher color sensitivity setting would reproduce it as black, while producing red pixels from more red original pixels.

Another option is to provide a button, not shown, which allows all unbalanced pixels to be reproduced in a particular accent color. Since the apparatus shown is only capable of one color (from two available) and black, in some documents it may be preferred to reproduce all blue and all red as either red or blue with all black reproduced as black. As more and more such options are considered, it becomes more convenient with modern copiers to scroll the options on a display screen rather than to try to provide separate buttons for each one. This, of course, is well within the present skill of the art. If the display is capable of displaying color information, logic 100 can display its intentions for adding color and ask for confirmation from the user.

As mentioned above, among the more simple adaptations of the FIGS. 2 and 3 embodiment would have colorfulness scanners in less than three colors. For example, a scanner, in addition to including a high resolution luminance CCD, would include more coarse CCD's of red and blue light sensitive elements. In use, if both the red and blue sensor signals are reduced in the same proportion from the white (or black) reference, one could infer that the area contained only white and black pixels. For this case, the information from the primary full addressability sensor is used unaltered to produce a single color black and white print. If the blue signal is reduced significantly (or disproportionally when compared to the red), it could be inferred that the area contains white background and red information. For this case, the full addressability sensors' information, for the area containing the red information, is diverted and used to create a red accent color image. If the blue signal is only slightly reduced and there is only background detected by the main sensor, one could infer that the area had been highlighted by a yellow marker. In this case, the main sensor's signal is left unaltered and an overprinting of yellow accent created for the area. If the first case is reversed, of course, blue accent is used.

Again, in each of these instances, the analysis needs to pick which of its available colors to use when it can use only one. This is accomplished by comparing the total colorfulness for various areas of the document according to whatever thresholds have been input into the logic and control for the particular colors that are in stations 72 and 74. Alternatively, the operator can be allowed to set the priority for respective cases, that is, the operator can say that red accent is more important than yellow highlight and, therefore, should be reproduced even if that means a loss of the yellow information. Note also that if the yellow highlight is not picked, it must be reproduced as white, not gray or black. This requires printing the black image at higher contrast than a yellow highlight image.

This FIGS. 2 and 3 embodiment can be used with a portion of an original using conventional electronic area selection. For example, using a digitizing tablet, the operator restricts color analysis to the top of an original. The logo or letterhead is then more easily recognized and colored despite other colors in the document.

The embodiment illustrated in FIGS. 2 and 3 is shown using FIG. 1 apparatus having only two available colors plus black. However, this approach can be adapted to picking two or more colors from two or more available colors. For example, a logo color and a highlight color could be picked providing a black, orange and pink tricolor copy from five available colors.

A second embodiment utilizing the FIG. 1 apparatus can be used with a variety of scanners 120. That is, scanner 120 can be either a color scanner or a black and white scanner. This embodiment will be illustrated, in part, with FIG. 4, but it will be understood that it can be incorporated into the approach illustrated in FIGS. 2 and 3. In summary, scanner 120 can be a black and white scanner which feeds a luminance signal to logic and control 120. As shown in FIG. 1, logic and control 120 includes pattern recognition electronics 180 (shown separately from logic and control 100 in FIG. 1, for illustration). Pattern recognition electronics 180 uses well established shape recognition principles utilized for optical character recognition and the like to recognize particular shapes of patterns in the original. For example, a particular shaped logo can be input into the memory of the logic and control 100. Similarly, its size and color can also alternatively be designated. Scanner 120 and pattern recognition electronics 180 analyze an original to recognize the shape and/or size of patterns in the original. When a pattern is recognized to fit a particular shape and/or size, image forming apparatus shown in FIG. 1 diverts the portion of the image making up that pattern to the second electrostatic image and thereby changes its color. If scanner 120 is a color scanner, it can recognize the color of the pattern and that information used to create the copy.

Figure 4:
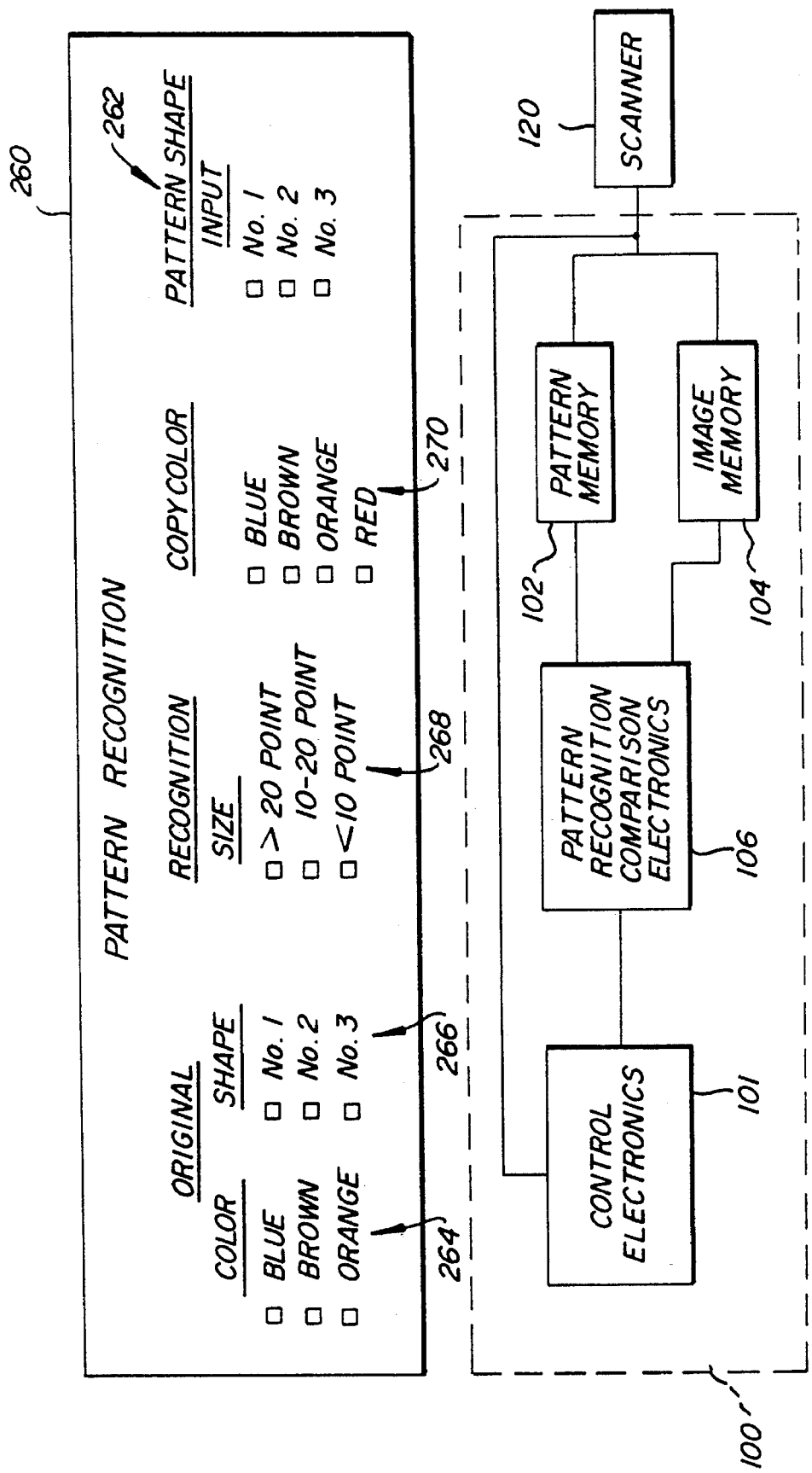

This approach can be best illustrated by reference to FIG. 4 showing a simplified form of an operator control panel 260 suitable for this embodiment. For illustration, operator control panel 260 is made up of various selector buttons. It should be recognized that with modern, more complicated copiers, the options can be greatly expanded by scrolling them on a screen.

Referring to FIG. 4, buttons associated with pattern shape input 262 are used to input shape into a pattern memory 102 of logic and control 100. More specifically, a sheet having a particular shaped pattern is scanned by scanner 120. The sheet can have only that pattern or it can be included with many other patterns and a digitizing tablet used to designate the particular pattern on that sheet to be input. The predetermined pattern or shape is placed in pattern memory 102 in logic and control 100. Using the buttons 262, that shape is designated either shape 1, shape 2 or shape 3 for later retrieval, as controlled by suitable control electronics 101 in logic and control 100.

When an original document to be copied is placed in scanner 120, appropriate buttons are pushed in an original recognition portion of operator control panel 260. More specifically, a particular color, shape and/or size is designated using color buttons 264, shape buttons 266 and size buttons 268. Electronic signals representing an image of the original scanned image is input into an image memory 104. Pressing a particular shape button causes pattern recognition comparison electronics 106 to search the image memory 104 for a particular one of the shapes input into the pattern memory 102.

For example, an original having a particular shape logo in several locations is placed in scanner 120 and shape button 2 and the first size button (greater than 20 point) are pressed. Logic and control 100 analyzes the original in scanner 120 and recognizes any pattern having both the characteristics of shape 2 and the "greater than 20 point" feature in size. A copy color button is also pressed from a selection of copy color buttons 270. These colors are those available in the apparatus to be used. The pattern recognized by the combination of scanner 120 and pattern recognition electronics 180 would then be colored with that color. This may be accomplished by "tagging" the data in image memory to identify those pixels that are to be printed in the accent color. The tagged data is then output to a buffer associated with the second LED printhead 17. Similarly, the untagged data is output to a buffer that stores data for the printhead 1. In lieu of tagging the data, the control electronics may be programmed to multiplex the data to an appropriate printhead's buffer in accordance with areas defined by the pattern recognition electronics as containing logo information. That is, every occurrence in the original where the designated shape and size are recognized, the pixels making up that shape are diverted to the formation of the second electrostatic image (FIG. 1). That electrostatic image is developed with the color toner picked using copy color buffers 270.

Alternatively, if scanner 120 is a color scanner, the color of the pattern alone, or combined with either the shape or size or both, can be used to recognize the pattern to be colored with the appropriate available color.

This embodiment is perhaps most spectacular and practical when scanner 120 is a black and white scanner only. In this instance, color buttons 264 are not part of operator control panel 260 and recognition is done entirely with shape and/or size. In this instance, a black pattern is recognized by its shape and size and made red, orange, brown or blue merely by the pressing of buttons and without the much more involved use of a digitizing tablet.

If the operator control panel 260 is replaced by a more sophisticated version using a screen, the shapes scanned into memory can be shown on the screen to assist the operator in picking the shape desired.

The usual logo shape requires character recognition electronics that are relatively unsophisticated compared to the present skill in that art. More sophisticated versions of this embodiment are, therefore, within the skill of the art by adapting more sophisticated recognition electronics. For example, some character types can be recognized or distinguished from others by present technology, allowing directions to the logic and control to color all italicized type and make the rest of the text black. Similarly, a standard font for Magnetic Ink Character Recognition (MICR) could be used to copy all characters in such a font in a magnetic toner. The remainder of the copy can be in a nonmagnetic toner, which may be of the same color, usually black.

Note also that shape or size alone can be used, although the combination of the two is often preferable. For example, it may be desirable to color only everything greater than a particular size. In many documents, that will be only the logo. This requires no logo shape input, only the ability of the electronics to recognize the size of a pattern. Similarly, if no size requirement is input, a shape would be colored regardless of size. This will work fine if the logo is distinguishable from all textural characters present.

This embodiment will not provide accent color for all originals without use of a digitizing tablet. However, the originals that it is useful with can be copied with considerably greater ease than by using a digitizing tablet.

Once a pattern is recognized for special color treatment, it can be treated with more than one color. For example, a logo having a red body with a black outline can be readily reproduced with the apparatus shown in FIG. 1 once that logo is recognized using whatever original recognition characteristics are used. In a very sophisticated version, recognition of one shape triggers the apparatus shown in FIG. 1 to replace it with a different shape. For example, recognition of an asterisk at some position on the original can trigger the apparatus to pull from memory logo 2 whereas a star symbol might trigger the apparatus to pull logo 1. In high security areas, the pattern may be a specific program name or code word which is reproduced in a special color or with an easily detectable material. Again, the copy controller could be keyed to make a log of the event. This would allow the person creating an original document to be copied to merely put an asterisk at a particular position and rely on an electronic copier to replace it with the proper logo.

The physical layout information can also be a pattern that is used to key the selection of accent color. For example, a title is usually in larger type, centered at the top of the page and separated from the body of the text, or a word written in an outline font at a diagonal (such as "Sample") can be selected to be written in the accent color. A pattern can be as simple as a tint pattern. Many computers will automatically replace an area that was in color on the display with a specific, user programmable tint pattern, when there is not a color printer available. This pattern is very easy to recognize.

The pattern that causes a specific action can be determined by several methods. As described above, they can be developed in advance and programmed into the logic of the machine. They can be captured by the user and stored for a job or stored permanently. For example, the user can use the digitizer to indicate the first occurrence of a particular word and request that the copier make all other occurrences of that word be in the selected color. They can be created by a neural network and a training set.

The invention has been described in detail with particular reference to a preferred embodiment thereof, but it will be understood that variations and modifications can be effected within the spirit and scope of the invention as described hereinabove and as defined in the appended claims.

I claim:

1. Image forming apparatus for forming a color image:

first means for forming a first image in a first color from electronic image information;

second means for forming a second image, combined or combinable with the first image, from electronic image information and in an accent color different from the first color;

means for electronically analyzing an original electronic image obtained by optical scanning and for recognizing a predetermined characteristic of a character, logo or other pattern, such as its size and/or its shape;

means for controlling the second image forming means to form an image in the accent color corresponding to patterns having the predetermined characteristic; and means for controlling the first image forming means to form an image in the first color corresponding to at least a portion of the original electronic image.

2. Image forming apparatus according to claim 1 including an electronic memory, wherein the means for analyzing an original includes means for recognizing a predetermined shape of a pattern by comparing that shape with a shape in the memory.

3. Image forming apparatus according to claim 2 wherein the means for analyzing an original includes means for recognizing a predetermined shape of a character and an aspect of the size of a character.

4. Image forming apparatus according to claim 1 wherein the means for analyzing further includes operator controllable means for inputting a characteristic or combination of characteristics to be recognized.

5. Image forming apparatus according to claim 1 wherein each of the first and second means for forming includes electrophotographic means for forming a toner image on an image member.

6. Image forming apparatus according to claim 1 including an optical scanner for creating an electronic signal from an optical image.

7. Image forming apparatus according to claim 1 further including means for combining said image of the first color and of the at least one accent color to form an at least two color image.

8. Image forming apparatus according to claim 1 wherein said controlling means includes means for forming a recognized character in a combination of the first color and the accent color.

9. Image forming apparatus according to claim 1 wherein the first color is black.

10. Image forming apparatus according to claim 2 further including means for scanning a reference pattern and for inputting that pattern into said electronic memory for use in recognizing pattern characteristics in analyzed original electronic images.

11. Image forming apparatus according to claim 10 further including means for inputting a plurality of shapes into said electronic memory and wherein said means for electronically analyzing includes operator control means for choosing from those shapes the shape to be compared with the pattern.

12. Image forming apparatus for making at least a two toner image:

first means for forming a first image in a first toner from electronic image information;

second means for forming a second image, combined or combinable with the first image, from electronic image information and in a second toner different from the first toner;

means for electronically analyzing a scanned original image and for recognizing a predetermined characteristic of a character, logo or other pattern, such as its size and/or its shape;

means for controlling the second image forming means to form an image in the second toner corresponding to patterns having the predetermined characteristic; and means for controlling the first image forming means to make an image in the first toner corresponding to at least a portion of the original image.

13. Image forming apparatus according to claim 12 wherein the first and second toners are of the same color and differ according to their magnetic properties.

14. Image forming apparatus according to claim 13 wherein the predetermined characteristic is a font type associated with magnetically readable characters and the second toner is a magnetic toner.

15. Image forming apparatus according to claim 12 wherein the means for analyzing includes means for recognizing a pattern entirely according to one or more size thresholds and said means for controlling the second image forming means includes means for forming an image in the second toner corresponding to patterns meeting the size threshold.

16. Image forming apparatus comprising:

a memory means for inputting an electronic signal indicative of a predetermined pattern shape into the memory, a scanner for creating an electronic signal indicative of the image content of an original, means for comparing the electronic signal indicative of the pattern shape with the electronic signal created by the scanner, means for copying the original, and means for controlling the copying means in response to the comparing means to treat patterns in the original corresponding to the input pattern differently from other portions of the original in copying the original.

17. Image forming apparatus according to claim 16 wherein the controlling means includes means for copying such corresponding patterns in a color different from the rest of the original.

18. A method of forming a two or more color image from an original, said method comprising:

optically scanning the original to provide an electronic representation of the original, analyzing the electronic representation for patterns having a predetermined recognizable shape, forming a first image in a first color from at least a portion of said electronic representation, forming a second image in a second color from a portion of the electronic representation recognized as having the predetermined recognizable shape of pattern, and combining the first and second images to form a two color image with the recognized patterns in the second color and at least a portion of the rest of the image in the first color.

19. The method according to claim 18 wherein the steps of forming the first and second images includes forming first and second toner images electrophotographically.

20. The method according to claim 19 wherein the step of forming the first toner image includes forming a black toner image.

* * * * *